(12) United States Patent
Nania (10) Patent No.: US 9,937,792 B2
(45) Date of Patent: Apr. 10, 2018

(54) OCCUPANT ALERTNESS-BASED NAVIGATION

(71) Applicant: Ford Global Technologies, LLC, Dearborn, MI (US)

(72) Inventor: Adrian Nania, Rochester, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 15/209,344

(22) Filed: Jul. 13, 2016

(65) Prior Publication Data

US 2018/0015825 A1    Jan. 18, 2018

(51) Int. Cl.

| | |
|---|---|
| *B60K 28/06* | (2006.01) |
| *B60Q 5/00* | (2006.01) |
| *B60Q 9/00* | (2006.01) |
| *B60R 1/00* | (2006.01) |
| *G01C 21/36* | (2006.01) |
| *G08B 21/04* | (2006.01) |
| *G08B 21/06* | (2006.01) |
| *G06K 9/00* | (2006.01) |
| *G06Q 10/02* | (2012.01) |

(52) U.S. Cl.
CPC ............ *B60K 28/066* (2013.01); *B60Q 5/005* (2013.01); *B60Q 9/00* (2013.01); *B60R 1/00* (2013.01); *G01C 21/3605* (2013.01); *G06K 9/00845* (2013.01); *G06Q 10/02* (2013.01); *G08B 21/0476* (2013.01); *G08B 21/06* (2013.01)

(58) Field of Classification Search
CPC ........ B60K 28/066; B60Q 5/005; B60Q 9/00; B60T 1/00

USPC .......................................................... 701/45
See application file for complete search history.

(56) References Cited

U.S. PATENT DOCUMENTS

| | | | |
|---|---|---|---|
| 7,027,621 B1 | 4/2006 | Prokoski | |
| 7,431,120 B2 * | 10/2008 | Pollehn | B60H 1/00742 180/272 |
| 9,296,382 B2 * | 3/2016 | Fung | B60K 28/06 |
| 2012/0078509 A1 * | 3/2012 | Choi | G01C 21/3461 701/423 |

(Continued)

FOREIGN PATENT DOCUMENTS

DE     102013021928 A1    6/2015

OTHER PUBLICATIONS

Steph Cockroft, *The Buzzing Steering Wheel That Could Help Save Lives: Cockpit Cameras That Read Drivers' Faces Will Alert Them If They Are Falling Asleep or Take Eyes Off Road*, May 2015 (2 Pages).

*Primary Examiner* — Yazan A Soofi
(74) *Attorney, Agent, or Firm* — James P. Muraff; Neal, Gerber & Eisenberg LLP (57) ABSTRACT

Systems and methods are disclosed for occupant alertness-based navigation. An example vehicle includes a camera and an occupant monitor. The example camera is affixed to a rear-view mirror of the vehicle to detect drowsiness events associated with a driver. The example occupant monitor is to, in response to detecting, with the camera, a first drowsiness event, provide feedback to a driver. Additionally, the example occupant monitor is to, in response to detecting a second drowsiness event after the first, select an accommodation in the geographic vicinity of the vehicle, and set a navigation system to navigate to the selected accommodation.

20 Claims, 4 Drawing Sheets

(56) References Cited

U.S. PATENT DOCUMENTS

| | | | |
|---|---|---|---|
| 2014/0135598 A1* | 5/2014 | Weidl | A61B 5/6893 600/301 |
| 2014/0240132 A1* | 8/2014 | Bychkov | A61B 5/18 340/576 |
| 2015/0379362 A1* | 12/2015 | Calmes | G06K 9/2036 348/136 |
| 2016/0104486 A1* | 4/2016 | Penilla | H04L 67/12 704/232 |

* cited by examiner

OCCUPANT ALERTNESS-BASED NAVIGATION

TECHNICAL FIELD

The present disclosure generally relates to vehicle occupant alertness detection and, more specifically, occupant alertness-based navigation.

BACKGROUND

Driving a vehicle requires a driver to be alert to the environment around the vehicle. When a driver is drowsy, the driver's reaction times slow and the driver may lose focus on the road. As such, a drowsy driver can be a risk to themselves, occupants of the vehicle, and others in the vicinity, such as other drivers and pedestrians.

SUMMARY

The appended claims define this application. The present disclosure summarizes aspects of the embodiments and should not be used to limit the claims. Other implementations are contemplated in accordance with the techniques described herein, as will be apparent to one having ordinary skill in the art upon examination of the following drawings and detailed description, and these implementations are intended to be within the scope of this application.

Example embodiments for a vehicle with occupant alertness-based navigation are disclosed. An example vehicle includes a camera and an occupant monitor. The example camera is affixed to a rear-view mirror of the vehicle to detect drowsiness events associated with a driver. The example occupant monitor is to, in response to detecting, with the camera, a first drowsiness event, provide feedback to a driver. Additionally, the example occupant monitor is to, in response to detecting a second drowsiness event after the first, select an accommodation in the geographic vicinity of the vehicle, and set a navigation system to navigate to the selected accommodation.

An example method of mitigating drowsiness of a driver of a vehicle includes monitoring, with a camera affixed to a rear-view mirror, the driver to detect drowsiness events. The example method also includes, in response to detecting a first drowsiness event, providing feedback to the driver. Additionally, the example method includes, in response to detecting a second drowsiness event after the first, selecting an accommodation in the geographic vicinity of the vehicle; and setting a navigation system to navigate to the selected accommodation.

A example tangible computer readable medium comprises instructions that, when executed, cause a vehicle to monitor, with a camera affixed to a rear-view mirror, the driver to detect drowsiness events. The example instructions also cause the vehicle to, in response to detecting a first drowsiness event, provide feedback to a driver. Additionally, the example instructions cause the vehicle to, in response to detecting a second drowsiness event after the first select an accommodation in the geographic vicinity of the vehicle, and set a navigation system to navigate to the selected accommodation.

BRIEF DESCRIPTION OF THE DRAWINGS

For a better understanding of the invention, reference may be made to embodiments shown in the following drawings. The components in the drawings are not necessarily to scale and related elements may be omitted, or in some instances proportions may have been exaggerated, so as to emphasize and clearly illustrate the novel features described herein. In addition, system components can be variously arranged, as known in the art. Further, in the drawings, like reference numerals designate corresponding parts throughout the several views.

DETAILED DESCRIPTION OF EXAMPLE EMBODIMENTS

While the invention may be embodied in various forms, there are shown in the drawings, and will hereinafter be described, some exemplary and non-limiting embodiments, with the understanding that the present disclosure is to be considered an exemplification of the invention and is not intended to limit the invention to the specific embodiments illustrated.

Driver fatigue is a serious issue that slows reaction times of drivers and lowers the environmental awareness of the driver. Various techniques may be employed to mitigate the drowsiness of the driver. For example, mitigating techniques may include increasing the volume of the sound system, increasing the output of the air conditioning blower, and decreasing the cabin temperature, etc. However, mitigation techniques may not be effective over a relatively long period of time. As described herein below, a vehicle includes camera(s) to monitor the driver. When the vehicle detects, via the camera(s), signs of drowsiness in the driver (e.g., driver posture, driver eye movement, location of gaze, etc.), the vehicle takes an escalating series of actions. Initially, the vehicle activates an audio, visual and/or haptic warning and/or activates a mitigation technique (e.g., activates/increases the volume of the sound system, increases the air conditioning blower, etc.). On a subsequent detection of the sign(s) of drowsiness in the driver, the vehicle (a) activates the audio, visual and/or haptic warning and/or activates the mitigation technique, (b) communicates with an external server to locate nearby accommodations (e.g., a hotel, a motel, a rest area, etc.), and (c) instructs the navigation system to set the selected accommodations as the destination of the vehicle. On an additional subsequent detection of the sign(s) of drowsiness in the driver, the vehicle (a) communicates with the external server to reserves a room at the selected accommodations, and (b) activates the audio, visual and/or haptic warning until the vehicle has reached the selected accommodations.

Figure 1:
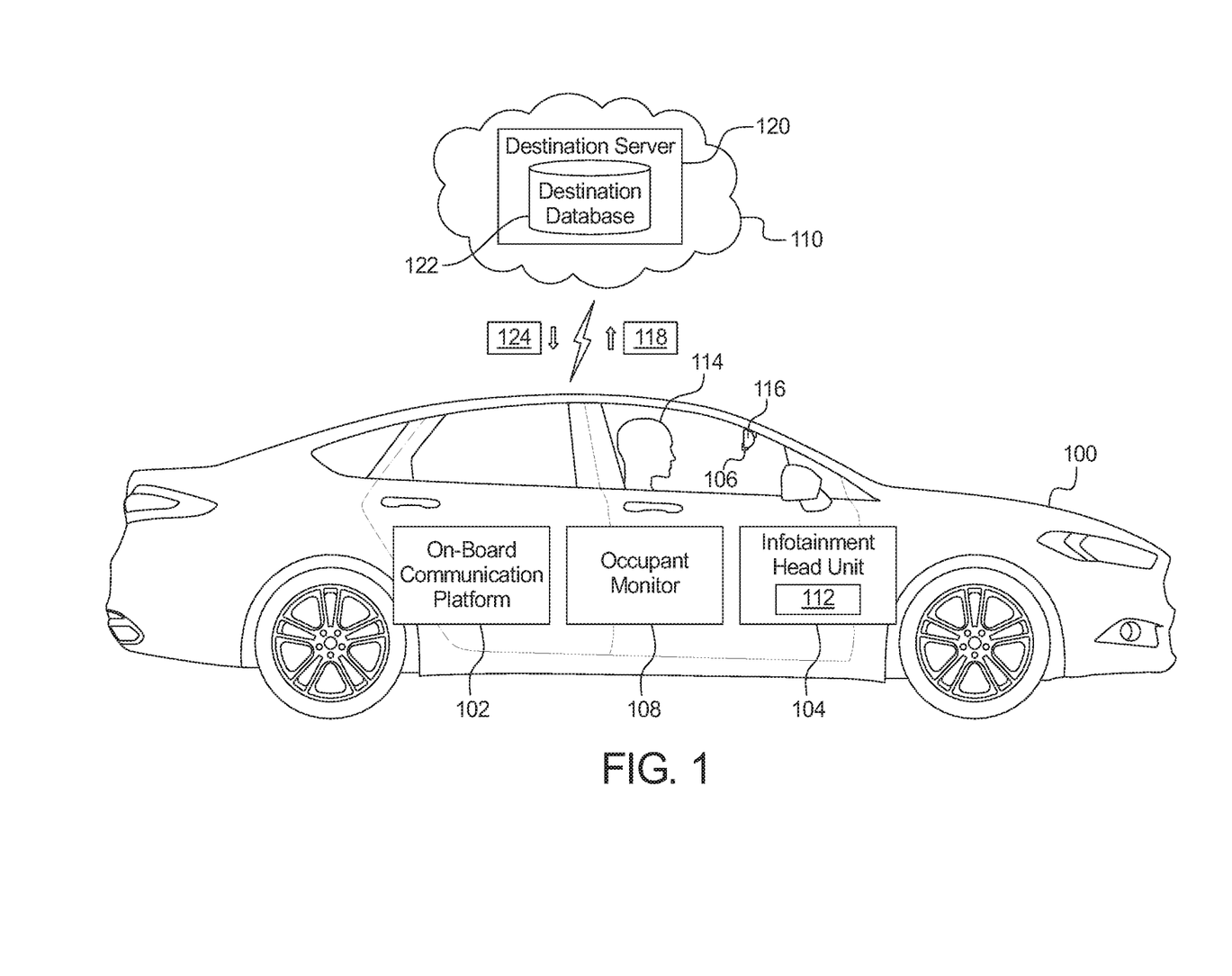
FIG. 1 illustrates a vehicle operating in accordance with the teachings of this disclosure.

FIG. 1 illustrates a vehicle 100 operating in accordance with the teachings of this disclosure. The vehicle 100 may be standard gasoline powered vehicles, hybrid vehicles, electric vehicles, fuel cell vehicles, and/or any other mobility implement type of vehicle. The vehicle 100 included parts related to mobility, such as a powertrain with an engine, a transmission, a suspension, a driveshaft, and/or wheels, etc. The vehicle 100 may be non-autonomous or semi-autonomous. In the illustrated example, the vehicle 100 includes an on-board communications platform 102, an infotainment head unit 104, driver cameras 106, and an occupant monitor 108.

The on-board communications platform 102 includes wired or wireless network interfaces to enable communication with an external network 110. The on-board communications platform 102 also includes hardware (e.g., processors, memory, storage, antenna, etc.) and software to control the wired or wireless network interfaces. In some examples, the on-board communications platform 102 includes a cellular modem, a dedicated short range communication module, and/or a wireless local area network (WLAN) controller. Alternatively or additionally, in some examples, the on-board communications platform 102 wired or wirelessly communicatively couples to a mobile device (e.g., a smart phone, a feature phone, a smart watch, a tablet, a laptop, etc) that is connected (e.g., via a cellular connection, etc.) to the external network 110. The cellular modem includes hardware and software to control wide area standards based networks (e.g., Global System for Mobile Communications (GSM), Universal Mobile Telecommunications System (UMTS), Long Term Evolution (LTE), Code Division Multiple Access (CDMA), etc.) operated by telecommunication companies. The WLAN controller includes hardware and software to communication with wireless local area standards based networks (WiMAX (IEEE 802.16m), local area wireless network (including IEEE 802.11 a/b/g/n/ac/p or others), and Wireless Gigabit (IEEE 802.11ad), etc.). In some examples, the on-board communication platform includes controller(s) for personal area networks (e.g., Near Field Communication (NFC), Bluetooth®, etc.). The on-board communications platform 102 may also include a global positioning system (GPS) receiver to receive the coordinates of the vehicle 100. Alternatively, in some examples, when the vehicle 100 is connected to the mobile device, the on-board communications platform 102 receives the coordinates from the mobile device (e.g., from a GPS receiver of the mobile device.). Further, the external network(s) 110 may be a public network, such as the Internet; a private network, such as an intranet; or combinations thereof, and may utilize a variety of networking protocols now available or later developed including, but not limited to, TCP/IP-based networking protocols.

The infotainment head unit 104 provides an interface between the vehicle 100 and a user (e.g., a driver, a passenger, etc.). The infotainment head unit 104 includes digital and/or analog interfaces (e.g., input devices and output devices) to receive input from the user(s) and display information. The input devices may include, for example, a control knob, an instrument panel, a digital camera for image capture and/or visual command recognition, a touch screen, an audio input device (e.g., cabin microphone), buttons, or a touchpad. The output devices may include instrument cluster outputs (e.g., dials, lighting devices), actuators, a heads-up display, a center console display (e.g., a liquid crystal display ("LCD"), an organic light emitting diode ("OLED") display, a flat panel display, a solid state display, etc.), and/or speakers. In the illustrated example, the infotainment head unit 104 includes hardware (e.g., a processor or controller, memory, storage, etc.) and software (e.g., an operating system, etc.) for an infotainment system 112. Additionally, the infotainment head unit 104 displays the infotainment system 112 on, for example, the center console display. In the illustrated example, the infotainment system 112 includes a navigation application that, when a destination in set, provides audio and visual guidance to direct the driver of the vehicle 100 to the destination.

The driver cameras 106 monitor a driver 114 to detect when the driver 114 is drowsy. The driver cameras 106 are mounted on a front of the rear-view mirror 116. In the illustrated example, the driver cameras 106 include integrated facial-feature recognition with infrared thermal imaging. The driver cameras 106 detects (a) the position of the head of the driver 114, (b) the state of the eyes (e.g., open, partially open, or closed) of the driver 114, and/or (c) the direction of the gaze of the driver 114.

The occupant monitor 108 monitors the driver 114 for signs of drowsiness. To detect the signs of drowsiness, the occupant monitor 108, via the driver cameras 106 the position of the head of the driver 114, (b) the state of the eyes (e.g., open, partially open, or closed) of the driver 114, and/or (c) the direction of the gaze of the driver 114. The occupant monitor 108 determines that the driver 114 is drowsy when (i) the head of the driver 114 nods for a threshold period of time (e.g., three seconds, etc.), (ii) the head of the driver 114 nods and is followed by a sharp jerk, (iii) the eyes of the driver 114 are closed for a threshold period of time, (iv) the time for the eyes of the driver 114 to transition from the open state to the closes state is greater than a threshold period of time (e.g., two seconds, etc.) or (v) the gaze of the driver 114 is at a threshold angle (e.g., 45 degrees below the horizon, etc.) for a threshold period of time (e.g., five second, etc.).

When one or more signs of drowsiness are detected, the occupant monitor 108 reacts to mitigate the drowsiness of the driver 114. To mitigate the drowsiness of the driver 114, the occupant monitor 108 (a) activates an audio, visual, and/or haptic alert, (b) activates a mitigation technique and/or (c) selects a destination for the navigation application to direct the driver 114. Upon detecting one or more signs of drowsiness after initially reacting, the occupant monitor 108 increases the reactions to mitigate the drowsiness of the driver 114. For example, in response to the first occasion of detecting a sign of drowsiness, the occupant monitor 108 may activate an audio, visual, and/or haptic alert and activate a mitigation technique. In such an example, in response to the second occasion of detecting a sign of drowsiness, the occupant monitor 108 may increase the volume and/or duration of the audio, visual, and/or haptic alert and connect to the external network 110 to determine a destination to direct the driver 114. In such an example, in response to the third occasion of detecting a sign of drowsiness, the occupant monitor 108 may further increase the volume and/or duration of the audio, visual, and/or haptic alert and book a room at an accommodation (e.g., a hotel, a motel, etc.) at the destination.

The audio, visual, and/or haptic alert includes a buzzer or a chime, a voice message, a warning displayed on the infotainment head unit 104, and/or the vibration of the steering wheel and/or the driver's seat. The mitigation techniques include adjusting settings of the heating, ventilating, and air conditioning (HVAC) system of the vehicle 100. For example, the occupant monitor 108 may decrease the temperature setting of the HVAC system so that the cabin of the vehicle 100 becomes cooler, and/or may increase the blower setting to increase air circulation within the cabin. In some examples, the mitigation techniques include activating a cooling system in the driver's seat of the vehicle 100. Additionally, in some examples, the occupant monitor 108 may activate and/or increase the volume of the sound system of the vehicle 100. In some such examples, in vehicles 100 equipped with directional audio (e.g., speakers of the vehicle 100 configured to direct the sound to particular seats in the vehicle 100), the occupant monitor 108 increases the volume of the sound to the driver's seat.

To select a destination, the occupant monitor 108 sends, via the on-board communications platform 102, a destination request 118 to a destination server 120 in the external network 110. The destination request 118 includes the current location of the vehicle 100. In some examples, the destination request 118 also includes a request to reserve a room at the located accommodations. In the illustrated examples, the destination server 120 includes a destination database 122 that includes records that associate accommodations with geographic coordinates. Additionally, in some examples, the destination server 120 also includes availability data. The destination server 120 may include an application program interface (API) to facilitate exchanging messages with the occupant monitor 108 of the vehicle 100. The destination server 120 and the destination database 122 are maintained by any suitable entity to provide location of accommodations (e.g., a search engine provider, a travel services provider, a vehicle manufacturer, etc.). In response to receiving the destination request 118, the destination server 120 selects one of the accommodations in the destination database 122. The destination server 120 selects one of the accommodations based on (a) a distance between the location of the vehicle 100 and the location of the accommodation (e.g., a smaller distance has a greater priority, etc.), (b) preferences specified by the driver during a registration process, (c) availability, and/or (d) price. In some examples, when requested by the destination request 118, the destination server 120 makes a reservation at the selected accommodations based on information (e.g., a credit card, an identifier, rewards program account number, etc.) provided during the registration process. The destination server 120 sends a destination response 124 to the occupant monitor 108 with coordinates of the selected accommodations, information (e.g., name, price, customer ratings, etc.) about the selected accommodations, and whether a reservation was made for the selected accommodations.

The occupant monitor 108 sets the destination of the navigation application of the infotainment system 112 to the coordinates provided in the destination response 124. Additionally, the infotainment system 112 displays the information regarding the selected accommodation from the destination response 124. When the destination server 120 did not reserve a room at the selected accommodation, the infotainment system 112 prompts the driver 114 whether to reserve a room. If the driver 114 selects the prompt, the occupant monitor 108 sends the destination request 118 to the destination server 120 to request reservation in a room of the selected accommodation.

Figure 2:
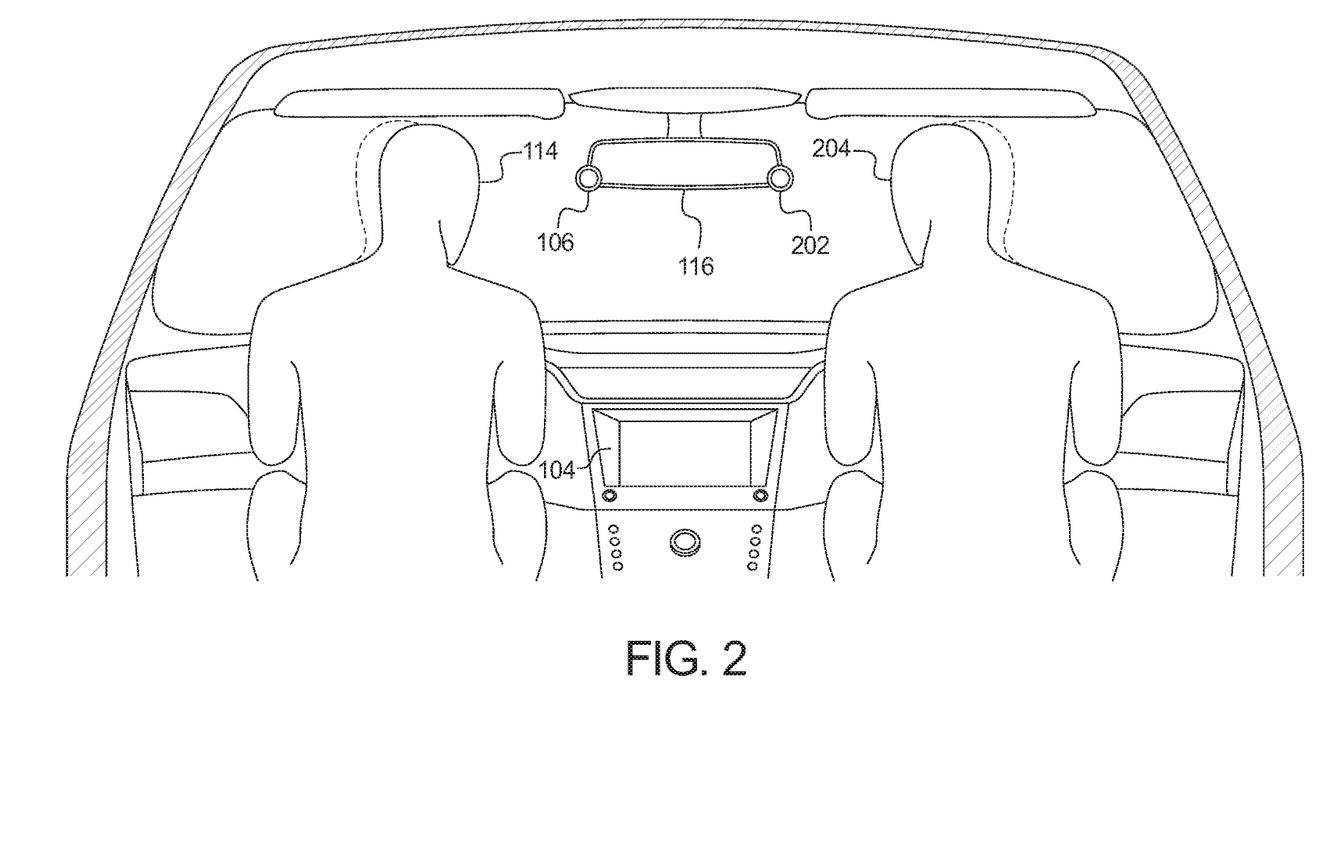
FIG. 2 illustrates an interior view of the vehicle of FIG. 1.

FIG. 2 illustrates an interior view of the vehicle 100 of FIG. 1. In the illustrated example, the vehicle 100 includes a passenger camera 202. The passenger camera 202 in attached to the rear-view mirror 116. The occupant monitor 108, via the passenger camera 202, monitors the drowsiness of a passenger 204. When the occupant monitor 108 detects that the passenger 204 is drowsy, the occupant monitor 108 adjusts the directional audio system to a lower setting for the passenger seat. In some examples, when the HVAC system of the vehicle 100 supports independent climate zones, the occupant monitor 108 raises the temperature of the climate zone of the passenger to raise the body temperature. In some examples, the passenger seat also automatically reclines.

Figure 3:
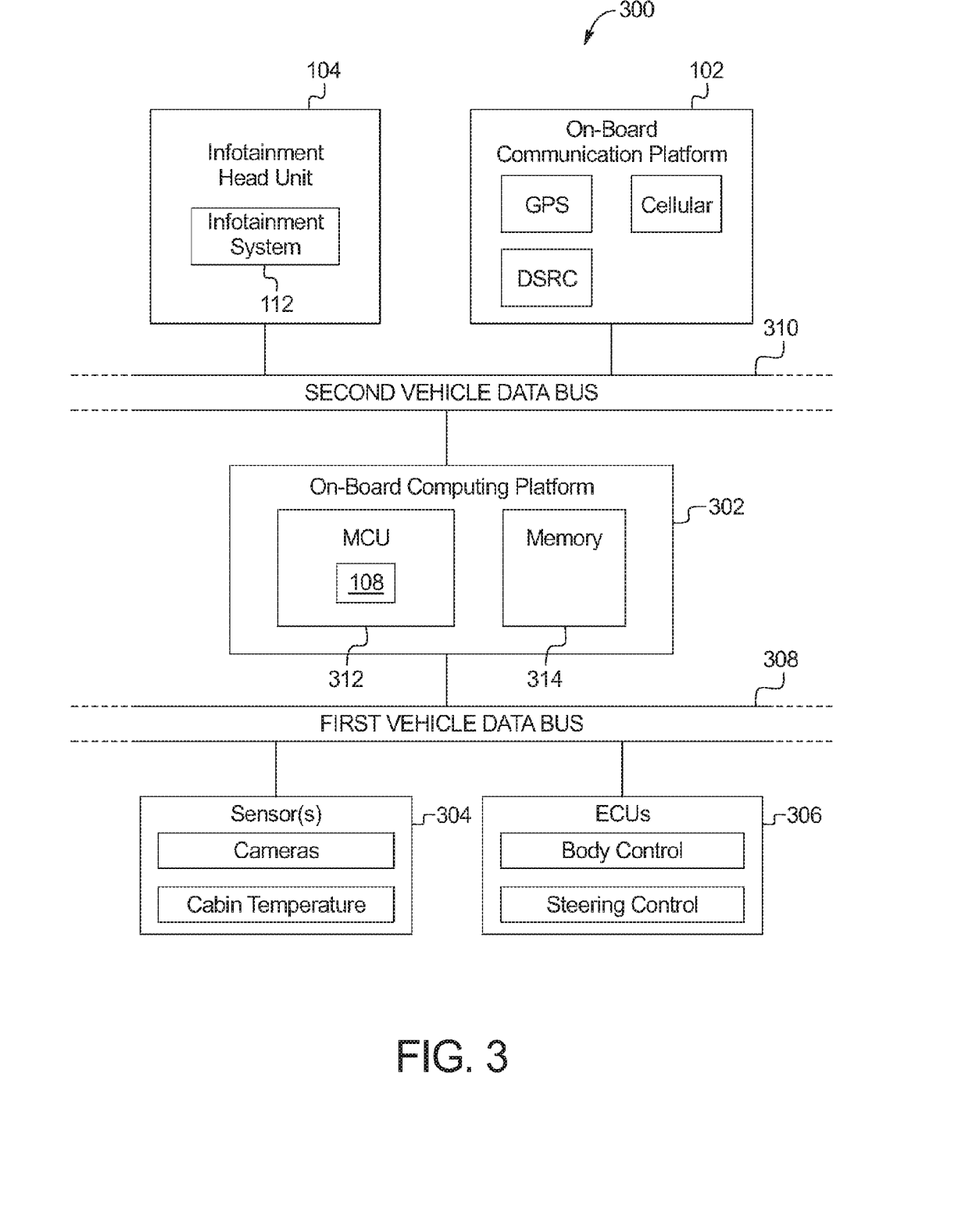
FIG. 3 is a block diagram of electronic components of the vehicle of FIG. 1.

FIG. 3 is a block diagram of electronic components 300 of the vehicle of FIG. 1. In the illustrated example, the electronic components 300 include the on-board communications platform 102, the infotainment head unit 104, an on-board computing platform 302, sensors 304, electronic control units (ECUs) 306, a first vehicle data bus 308, and a second vehicle data bus 310.

The on-board computing platform 302 includes a processor or controller 312 and memory 314. In some examples, the on-board computing platform 302 is structured to include the occupant monitor 108. Alternatively, in some examples, the occupant monitor 108 may be incorporated into an ECU 306 with its own processor and memory. The processor or controller 312 may be any suitable processing device or set of processing devices such as, but not limited to: a microprocessor, a microcontroller-based platform, a suitable integrated circuit, one or more field programmable gate arrays (FPGAs), and/or one or more application-specific integrated circuits (ASICs). The memory 314 may be volatile memory (e.g., RAM, which can include non-volatile RAM, magnetic RAM, ferroelectric RAM, and any other suitable forms); non-volatile memory (e.g., disk memory, FLASH memory, EPROMs, EEPROMs, memristor-based non-volatile solid-state memory, etc.), unalterable memory (e.g., EPROMs), read-only memory, and/or high-capacity storage devices (e.g., hard drives, solid state drives, etc). In some examples, the memory 314 includes multiple kinds of memory, particularly volatile memory and non-volatile memory.

The memory 314 is computer readable media on which one or more sets of instructions, such as the software for operating the methods of the present disclosure can be embedded. The instructions may embody one or more of the methods or logic as described herein. In a particular embodiment, the instructions may reside completely, or at least partially, within any one or more of the memory 314, the computer readable medium, and/or within the processor 312 during execution of the instructions.

The terms "non-transitory computer-readable medium" and "computer-readable medium" should be understood to include a single medium or multiple media, such as a centralized or distributed database, and/or associated caches and servers that store one or more sets of instructions. The terms "non-transitory computer-readable medium" and "computer-readable medium" also include any tangible medium that is capable of storing, encoding or carrying a set of instructions for execution by a processor or that cause a system to perform any one or more of the methods or operations disclosed herein. As used herein, the term "computer readable medium" is expressly defined to include any type of computer readable storage device and/or storage disk and to exclude propagating signals.

The sensors 304 may be arranged in and around the vehicle 100 in any suitable fashion. The sensors 304 may measure properties around the exterior of the vehicle 100. Additionally, some sensors 304 may be mounted inside the cabin of the vehicle 100 or in the body of the vehicle 100 (such as, the engine compartment, the wheel wells, etc.) to measure properties in the interior of the vehicle 100. For example, such sensors 304 may include accelerometers, odometers, tachometers, pitch and yaw sensors, wheel speed sensors, microphones, tire pressure sensors, and biometric sensors, etc. In the illustrated example, the sensors 304 include the driver cameras 106 and a cabin temperature sensor. In some examples, the sensors 304 also include the passenger camera 202 of FIG. 2.

The ECUs 306 monitor and control the subsystems of the vehicle 100. The ECUs 306 communicate and exchange information via the first vehicle data bus 308. Additionally, the ECUs 306 may communicate properties (such as, status of the ECU 306, sensor readings, control state, error and diagnostic codes, etc.) to and/or receive requests from other ECUs 306. Some vehicles 100 may have seventy or more ECUs 306 located in various locations around the vehicle 100 communicatively coupled by the first vehicle data bus 308. The ECUs 306 are discrete sets of electronics that include their own circuit(s) (such as integrated circuits, microprocessors, memory, storage, etc.) and firmware, sensors, actuators, and/or mounting hardware. In the illustrated example, the ECUs 306 include a body control unit and a steering control unit. The steering control unit includes a vibration-feedback device to vibrate the steering wheel when the occupant monitor 108 detects that the driver 114 is drowsy.

The first vehicle data bus 308 communicatively couples the sensors 304, the ECUs 306, the on-board computing platform 302, and other devices connected to the first vehicle data bus 308. In some examples, the first vehicle data bus 308 is implemented in accordance with the controller area network (CAN) bus protocol as defined by International Standards Organization (ISO) 11898-1. Alternatively, in some examples, the first vehicle data bus 308 may be a Media Oriented Systems Transport (MOST) bus, or a CAN flexible data (CAN-FD) bus (ISO 11898-7). The second vehicle data bus 310 communicatively couples the on-board communications platform 102, the infotainment head unit 104, and the on-board computing platform 302. The second vehicle data bus 310 may be a MOST bus, a CAN-FD bus, or an Ethernet bus. In some examples, the on-board computing platform 302 communicatively isolates the first vehicle data bus 308 and the second vehicle data bus 310 (e.g., via firewalls, message brokers, etc.). Alternatively, in some examples, the first vehicle data bus 308 and the second vehicle data bus 310 are the same data bus.

Figure 4:
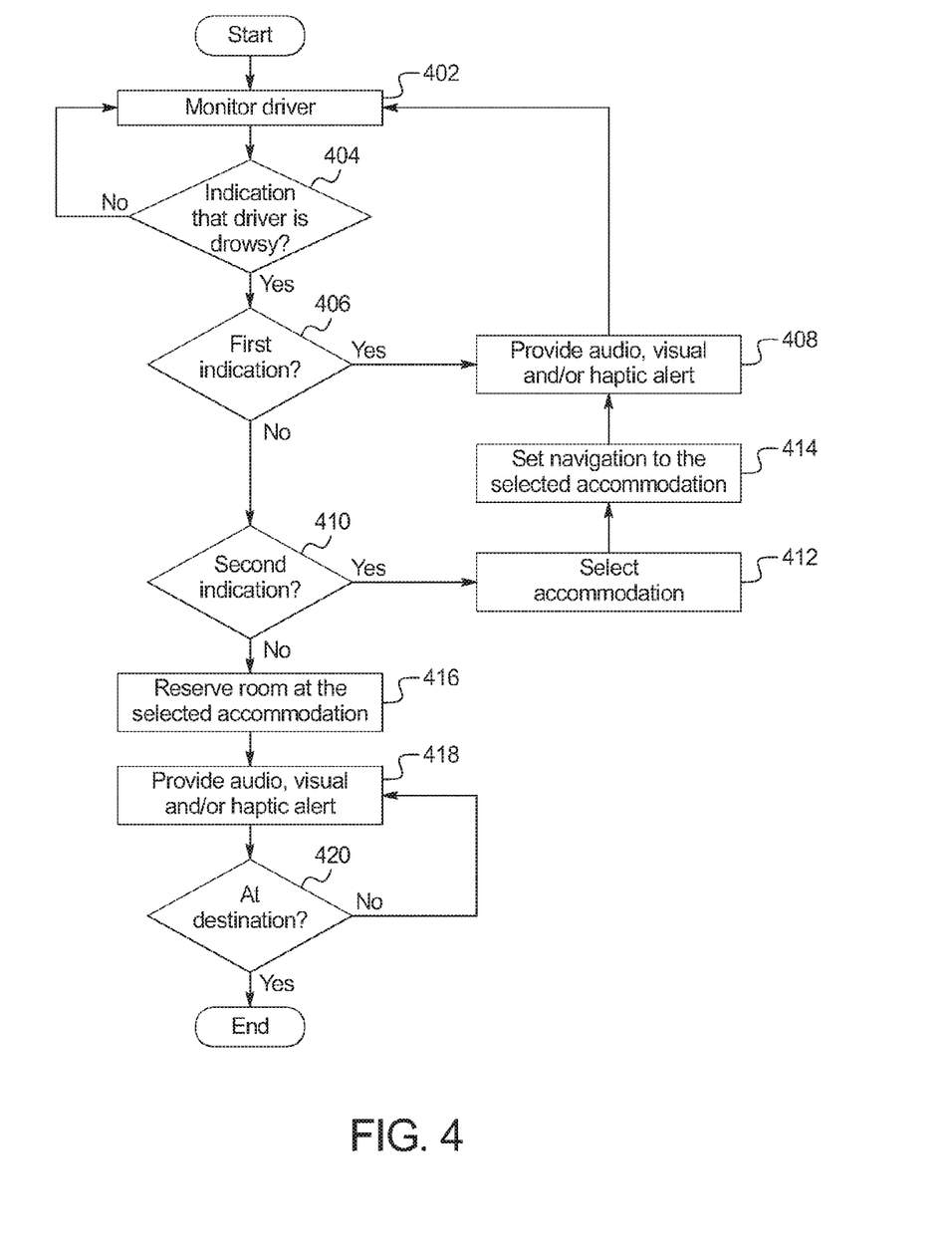
FIG. 4 is a flow diagram of a method to provide alerts for occupant alertness that may be implemented by the electronic components of FIG. 3.

FIG. 4 is a flow diagram of a method to provide alerts for occupant alertness that may be implemented by the electronic components 300 of FIG. 3. Initially, at block 402, the occupant monitor 108 monitors the driver 114 via the driver camera(s) 106. At block 404, the occupant monitor 108 determines whether there is an indication that the driver 114 is drowsy. For example, the occupant monitor 108 may determine that the driver 114 is drowsy when (i) the head of the driver 114 nods for a threshold period of time (e.g., three seconds, etc.), (ii) the head of the driver 114 nods and is followed by a sharp jerk, (iii) the eyes of the driver 114 are closed for a threshold period of time, (iv) the time for the eyes of the driver 114 to transition from the open state to the closes state is greater than a threshold period of time (e.g., two seconds, etc.) or (v) the gaze of the driver 114 is at a threshold angle (e.g., 45 degrees below the horizon, etc.) for a threshold period of time (e.g., five second, etc.). If the occupant monitor 108 determines that the driver 114 is drowsy, the method continues at block 406. Otherwise, if the occupant monitor 108 does not determine that the driver 114 is drowsy, the method returns to block 402.

At block 406, the occupant monitor 108 determines whether this is the first indication that the driver 114 is drowsy. If it is the first indication, the method continues at block 408. Otherwise, if it is not the first indication, the method continues at block 410. At block 408, the occupant monitor 108 provides an audio, visual, and/or haptic alert. Additionally, in some examples, the occupant monitor 108 activates a mitigation technique. At block 410, the occupant monitor 108 determines whether this is the second indication that the driver 114 is drowsy. If it is the second indication, the method continues at block 412. Otherwise, if it is not the second indication, the method continues at block 416.

At block 412, the occupant monitor 108 sends the destination request 118 to the destination server 120 to select an accommodation. At block 414, in response to receiving the destination response 122 with the coordinates of the selected accommodation, the occupant monitor 108 sets the navigation application on the infotainment system 112 to navigate to the coordinates received in the destination response 122.

At block 416, the occupant monitor 108 sends the destination request 118 to the destination server 120 to reserve a room at the accommodation selected at block 412. At block 418, the occupant monitor 108 provides an audio, visual, and/or haptic alert. Additionally, in some examples, the occupant monitor 108 may implement an addition mitigation technique. At block 420, the occupant monitor 108 determines whether the vehicle 100 is at the coordinates of the accommodation received at block 412. If the vehicle 100 is at the coordinates of the selected accommodation, the method ends. Otherwise, if the vehicle 100 is at the coordinates of the selected accommodation, the method returns to block 418.

The flowchart of FIG. 4 is a method that may be implemented by machine readable instructions that comprise one or more programs that, when executed by a processor (such as the processor 312 of FIG. 3), cause the vehicle 100 to implement the occupant monitor 108 of FIG. 1. Further, although the example program(s) is/are described with reference to the flowchart illustrated in FIG. 4, many other methods of implementing the example occupant monitor 108 may alternatively be used. For example, the order of execution of the blocks may be changed, and/or some of the blocks described may be changed, eliminated, or combined.

In this application, the use of the disjunctive is intended to include the conjunctive. The use of definite or indefinite articles is not intended to indicate cardinality. In particular, a reference to "the" object or "a" and "an" object is intended to denote also one of a possible plurality of such objects. Further, the conjunction "or" may be used to convey features that are simultaneously present instead of mutually exclusive alternatives. In other words, the conjunction "or" should be understood to include "and/or". The terms "includes," "including," and "include" are inclusive and have the same scope as "comprises," "comprising," and "comprise" respectively.

The above-described embodiments, and particularly any "preferred" embodiments, are possible examples of implementations and merely set forth for a clear understanding of the principles of the invention. Many variations and modifications may be made to the above-described embodiment(s) without substantially departing from the spirit and principles of the techniques described herein. All modifications are intended to be included herein within the scope of this disclosure and protected by the following claims.

What is claimed is:

1. A vehicle comprising:
   a camera affixed to a rear-view mirror to detect drowsiness events; and
   an occupant monitor to:
   in response to detecting, with the camera, a first drowsiness event, provide feedback to a driver; and
   in response to detecting a second drowsiness event after the first:
   select an accommodation in a geographic vicinity of the vehicle; and
   automatically set a navigation system to navigate to the selected accommodation.

2. The vehicle of claim 1, wherein the occupant monitor is to, in response to detecting the second drowsiness event after the first, prompt the driver, via an infotainment head unit, to reserve a room at the selected accommodation.

3. The vehicle of claim 1, wherein the occupant monitor is to select the accommodation based on at least one of a distance between a location of the vehicle and a location of the accommodation, preferences specified by the driver during a registration process, availability of rooms at the accommodation, or a price of the rooms at the accommodation.

4. The vehicle of claim 1, wherein the occupant monitor is to, in response to detecting a third drowsiness event after the second, automatically reserve a room at the selected accommodation.

5. The vehicle of claim 1, wherein the feedback is at least one of an audio, visual, or haptic alert.

6. The vehicle of claim 1, wherein the camera includes integrated facial-feature recognition with infrared thermal imaging.

7. A method of mitigating drowsiness of a driver of a vehicle comprising:
monitoring, with a camera affixed to a rear-view mirror, the driver to detect drowsiness events; and
in response to detecting a first drowsiness event, providing, via a processor, feedback to the driver; and
in response to detecting a second drowsiness event after the first during:
selecting an accommodation in a geographic vicinity of the vehicle; and
automatically setting a navigation system to navigate to the selected accommodation.

8. The method of claim 7, including in response to detecting the second drowsiness event after the first, prompting the driver, via an infotainment head unit, to reserve a room at the selected accommodation.

9. The method of claim 7, wherein selecting the accommodation is based on at least one of a distance between a location of the vehicle and a location of the accommodation, preferences specified by the driver during a registration process, availability of rooms at the accommodation, or a price of the rooms at the accommodation.

10. The method of claim 7, including in response to detecting a third drowsiness event after the second, automatically reserving, with the processor, a room at the selected accommodation.

11. The method of claim 7, wherein the feedback is at least one of an audio, visual, or haptic alert.

12. The method of claim 7, wherein the camera includes integrated facial-feature recognition with infrared thermal imaging.

13. A tangible computer readable medium comprising instructions that, when executed, cause a vehicle to:
monitor, with a camera affixed to a rear-view mirror, a driver to detect drowsiness events; and
in response to detecting a first drowsiness event, provide feedback to the driver; and
in response to detecting a second drowsiness event after the first:
select an accommodation in a geographic vicinity of the vehicle; and
automatically set a navigation system to navigate to the selected accommodation.

14. The computer readable medium of claim 13, wherein the instructions, when executed, cause the vehicle to, in response to detecting the second drowsiness event after the first, prompt the driver, via an infotainment head unit, to reserve a room at the selected accommodation.

15. The computer readable medium of claim 13, wherein the accommodation is selected based on at least one of a distance between a location of the vehicle and a location of the accommodation, preferences specified by the driver during a registration process, availability of rooms at the accommodation, or a price of the rooms at the accommodation.

16. The computer readable medium of claim 13, wherein the instructions, when executed, cause the vehicle to, in response to detecting a third drowsiness event after the second, automatically reserve a room at the selected accommodation.

17. The computer readable medium of claim 13, wherein the feedback is at least one of an audio, visual, or haptic alert.

18. The computer readable medium of claim 13, wherein the camera includes integrated facial-feature recognition with infrared thermal imaging.

19. The vehicle of claim 4, including after automatically reserve a room at the selected accommodation, provide the feedback to the driver until the vehicle reaches the selected accommodation, the feedback being at least one of an audio, visual, or haptic alert.

20. The vehicle of claim 19, including increasing an intensity of the feedback after automatically reserve the room at the selected accommodation.

* * * * *